(12) United States Patent
Cabot et al.

(10) Patent No.: US 8,214,200 B2
(45) Date of Patent: Jul. 3, 2012

(54) FAST MDCT (MODIFIED DISCRETE COSINE TRANSFORM) APPROXIMATION OF A WINDOWED SINUSOID

(75) Inventors: Richard C. Cabot, Lake Oswego, OR (US); Matthew S. Ashman, Portland, OR (US)

(73) Assignee: XFRM, Inc., Portland, OR (US)

( * ) Notice: Subject to any disclaimer, the term of this patent is extended or adjusted under 35 U.S.C. 154(b) by 1156 days.

(21) Appl. No.: 11/724,014

(22) Filed: Mar. 14, 2007

(65) Prior Publication Data

US 2008/0228471 A1 Sep. 18, 2008

(51) Int. Cl.
*G10L 19/02* (2006.01)
*G10L 21/00* (2006.01)
*G10L 19/00* (2006.01)
*G10L 19/12* (2006.01)
*G10L 11/06* (2006.01)

(52) U.S. Cl. ........ 704/203; 704/201; 704/204; 704/212; 704/219; 704/223; 704/229; 704/214; 704/208

(58) Field of Classification Search ................ 704/203, 704/204, 501, 212, 219–223, 201, 229, 214, 704/208; 341/50
See application file for complete search history.

(56) References Cited

U.S. PATENT DOCUMENTS

| | | | | |
|---|---|---|---|---|
| 4,937,873 A * | 6/1990 | McAulay et al. | ............ | 704/265 |
| 5,357,594 A | 10/1994 | Fielder | | |
| 5,420,516 A | 5/1995 | Cabot | | |
| 5,504,833 A * | 4/1996 | George et al. | ................ | 704/211 |
| 5,592,584 A | 1/1997 | Ferreira et al. | | |
| 5,913,191 A * | 6/1999 | Fielder | ......................... | 704/230 |
| 5,970,461 A | 10/1999 | Chatterton | | |
| 6,343,304 B1 | 1/2002 | Yang et al. | | |
| 6,430,529 B1 | 8/2002 | Huang | | |
| 6,771,828 B1 * | 8/2004 | Malvar | ......................... | 382/240 |
| 6,856,262 B2 * | 2/2005 | Mayer et al. | .................... | 341/50 |
| 7,058,571 B2 | 6/2006 | Tshushima et al. | | |
| 7,516,064 B2 * | 4/2009 | Vinton et al. | ................. | 704/206 |
| 7,987,089 B2 * | 7/2011 | Krishnan et al. | ............. | 704/214 |
| RE42,935 E * | 11/2011 | Cheng et al. | ................. | 702/190 |
| 2006/0293881 A1 * | 12/2006 | Hou | ............................. | 704/203 |
| 2007/0100610 A1 * | 5/2007 | Disch et al. | ................... | 704/212 |
| 2007/0124138 A1 * | 5/2007 | Lamblin et al. | ............. | 704/212 |
| 2007/0196022 A1 * | 8/2007 | Geiger et al. | ................ | 382/232 |
| 2010/0023322 A1 * | 1/2010 | Schnell et al. | ............... | 704/211 |

OTHER PUBLICATIONS

Huang et al., "Integer fast modified cosine transform," in Proc. Multimedia and Expo. ICME, Jul. 2003, vol. 2, pp. 729-732.*
Marek et al., A Modified Integer Cosine Transform With Constant Self Scalar Product of the Basis Vectors Image Coding, Applied Signal Processing, United Kingdom, 1995, vol. 2, .37-47.*

(Continued)

*Primary Examiner* — Douglas Godbold
*Assistant Examiner* — Edgar Guerra-Erazo
(74) *Attorney, Agent, or Firm* — Law Office of Karen Dana Oster, LLC (57) ABSTRACT

Methods and apparatus are disclosed for approximating an MDCT coefficient of a block of windowed sinusoid having a defined frequency, the block being multiplied by a window sequence and having a block length and a block index. A finite trigonometric series is employed to approximate the window sequence. A window summation table is pre-computed using the finite trigonometric series and the defined frequency of the sinusoid. A block phase is computed for each block with the defined frequency, the block length and the block index. An MDCT coefficient is approximated by the dot product of a phase vector computed using the block phase with a corresponding row of the window summation table.

23 Claims, 7 Drawing Sheets

OTHER PUBLICATIONS

H.-C. Chiang and J.-C. Liu, "Regressive implementations for the forward and inverse MDCT in MPEG audio coding," IEEE Signal Processing Lett., vol. 3, pp. 116-118, Apr. 1996.*

M.H. Cheng and Y.H. Hsu, Fast IMDCT and MDCT algorithms-a matrix approach, IEEE Trans. Signal Process. 51 (Jan. 2003) (1), pp. 221-229.*

Ferreira, A.J.S.;, "Accurate estimation in the ODFT domain of the frequency, phase and magnitude of stationary sinusoids," Applications of Signal Processing to Audio and Acoustics, 2001 IEEE Workshop on the, vol., No., pp. 47-50, 2001.*

Ferreira, A.; Sinha, D.;, "Accurate and robust frequency estimation in the ODFT domain," Applications of Signal Processing to Audio and Acoustics, 2005. IEEE Workshop on, vol., No., pp. 203-206, Oct. 16-19, 2005.*

Meng-Yao Zhu; Wei Zheng; Dong-Xiao Li; Ming Zhang;, "An accurate low complexity algorithm for frequency estimation in MDCT domain," Consumer Electronics, IEEE Transactions on, vol. 54, No. 3, pp. 1022-1028, Aug. 2008.*

J. Princen, A. Bradley, "Analysis/Synthesis Filter Bank Design Based on Time Domain Aliasing Cancellation," IEEE Trans. on ASSP, vol. ASSP-3, No. 5 Oct. 1986, pp. 1153-1161.

"OPT-2711 Dolby Digital Generator," Audio Precision Product Bulletin.

L. Daudet, M. Sandler, "MDCT Analysis of Sinusoids: Exact Results and Applications for Coding Artifacts Reduction," IEEE Trans. on Speech and Audio Processing, vol. 12, No. 3.

* cited by examiner

```
#include "memory.h"

#define PI      3.1415926
#define N       512             // block.length
define L       11              // number of window coefficients // constants used for pre-computed tables
const float NHAT = (N + 2.0) / 4.0;
const float D_OMEGA = (2.0 * PI) / N;

float omega = 0.1;              // discrete-time sinusoid frequency
int m = 0;                      // block index float w[L];                     // window series coefficients
float cos_table[256];           // cos(NHAT * OMEGAK)
float sin_table[256];           // sin(NHAT * OMEGAK)
float sum_table[256][4];        // window summation table // compute window coefficients by dot product with shifted cosine basis
void window_coeffs(float * window)
{
   float accum;
   int l;       // window coefficient index
   int n;       // sample index for (l = 0; l < L; l++)
   {
      accum = 0;
      for (n = 0; n < N; n++)
         accum += window[n] * cos(((2*PI*(n+0.5)) / N);
      w[l] = accum;
   }
}

// compute sum from p={0...P} of sin(pC)
float sumsin(int P, float C)
{
   if (C == 0)
      return 0;
   else
      return (sin(0.5*P*C) * sin(0.5*(P+1)*C)) / (sin(0.5*C));
}

// compute sum from p={0...P} of cos(pC)
float sumcos(int P, float C)
{
   if (C == 0)
      return P + 1;
   else
      return (cos(0.5*P*C) * sin(0.5*(P+1)*C)) / (sin(0.5*C));
}
```

FIG. 5

```
// build window summation table, cosine and sine tables
void build_tables()
{
    const int N_SUM = N - 1;
    int k, l;

// clear window summation table
    memset(&sum_table[0][0], 0x00, sizeof(sum_table));

// loop for all MDCT coefficients k
    for (k = 0; k < 256; k++)
    {
        // build cosine and sine tables for phase factors
        float arg = (NHAT * D_OMEGA) * (k + 0.5);
        cos_table[k] = COSINE(arg);
        sin_table[k] = SINE(arg);

// compute window summation table row for MDCT coeffcient k
        for (l = 0; l < L; l++)
        {
            float thetap = D_OMEGA * (0.5 + k + l);
            float thetam = D_OMEGA * (0.5 + k - l);
            float arg2 = (PI * l) / N;
            float cl = COSINE(arg2);
            float sl = SINE(arg2);

sum_table[k][0] = sum_table[k][0] + W[l] *
                              (cl * (sumsin(N_SUM, omega + thetap)
                                   + sumsin(N_SUM, omega + thetam))
                             + sl * (sumcos(N_SUM, omega + thetap
                                   - sumcos(N_SUM, omega + thetam)));
            sum_table[k][1] = sum_table[k][1] + W[l] *
                              (cl * (sumcos(N_SUM, omega + thetap)
                                   + sumcos(N_SUM, omega + thetam))
                             + sl * (sumsin(N_SUM, omega + thetam)
                                   - sumsin(N_SUM, omega + thetap)));
            sum_table[k][2] = sum_table[k][2] + W[l] *
                              (cl * (sumsin(N_SUM, omega - thetap)
                                   + sumsin(N_SUM, omega - thetam))
                             + sl * (sumcos(N_SUM, omega - thetam)
                                   - sumcos(N_SUM, omega - thetap)));
            sum_table[k][3] = sum_table[k][3] + W[l] *
                              (sl * (sumsin(N_SUM, omega - thetam)
                                   - sumsin(N_SUM, omega - thetap))
                             - cl * (sumcos(N_SUM, omega - thetap)
                                   + sumcos(N_SUM, omega - thetam)));
        }
    }
}
```

FIG. 6

```
// compute approximate MDCT coefficients for block m
void compute_coeffs(float * coeffs, float amplitude)
{
   float phi = m * (omega * (N / 2));   // block phase
   float phase[4];                       // phase vector float cphi = cos(phi);
   float sphi = sin(phi);

int k;

// loop for all MDCT coefficients k
   for (k = 0; k < 256; k++)
   {
      float accum = 0;

// compute phase vector k
      phase[0] = 0.25 * ((cphi * cos_table[k]) - (sphi * sin_table[k]));
      phase[1] = 0.25 * ((cphi * sin_table[k]) + (sphi * cos_table[k]));
      phase[2] = 0.25 * ((cphi * cos_table[k]) + (sphi * sin_table[k]));
      phase[3] = 0.25 * ((cphi * sin_table[k]) - (sphi * cos_table[k]));

// dot product of window summation table row k with phase vector k
      accum += phase[0] * s->sum_table[k][0];
      accum += phase[1] * s->sum_table[k][1];
      accum += phase[2] * s->sum_table[k][2];
      accum += phase[3] * s->sum_table[k][3];

// scale coefficients to produce desired amplitude
      coeffs[k] = amplitude * accum;
   } m++;   // increment block number
}
```

FIG. 7

FAST MDCT (MODIFIED DISCRETE COSINE TRANSFORM) APPROXIMATION OF A WINDOWED SINUSOID

BACKGROUND OF THE INVENTION

The present invention relates generally to methods for audio signal bandwidth compression and to digital audio test and measurement systems. In a specific application, the present invention applies to the generation of sinusoidal test signals in MDCT-based (modified discrete cosine transform) coding formats for testing the audio performance of devices which accept and decode such signals.

MDCT-based audio codecs are in widespread use today for the purposes of reducing transmission bandwidth or storage requirements for digital audio programs. Using the MDCT, it is possible to obtain a critically sampled (i.e. no redundant information) transform representation with 50% overlapping signal blocks. When analysis/synthesis windows satisfying the symmetry requirements of TDAC (time domain aliasing cancellation) are used, the MDCT is perfectly invertible. For more details refer to Princen and Bradley, "Analysis/Synthesis Filter Bank Design Based on Time Domain Aliasing Cancellation," *IEEE Transactions on Acoustics, Speech and Signal Processing*, Vol. ASSP-34, No. 5, October 1986, pp. 1153-1161.

Audio codecs using the MDCT include Dolby® AC-3, MPEG-1 Audio Layer 3, and MPEG-4 AAC. Generally speaking these codecs use the MDCT as a time to frequency transformation and transmit quantized MDCT coefficients at a reduced bitrate for synthesis in the decoder. Psychoacoustic models are employed to determine the perceptual relevance of the various spectral components which result from each block MDCT. Based on these models, MDCT bins containing little energy or those which are perceptually masked by nearby dominant frequencies are quantized with fewer bits of resolution.

Many devices for home audio, mobile audio, wireless communications, etc. now accept coded audio as a primary input audio format. For testing such devices it is convenient to deliver MDCT-coded test signals directly to the audio decoder in the device under test (DUT). There are many classes of signals which are used as stimulus for audio testing applications but by far the most commonly employed is the sinusoid. Sinusoidal signals are nearly ubiquitous for testing applications since they are eigenfunctions of any linear time invariant (LTI) system. Frequency and phase response may be computed by observation of the amplitude and phase relationship of input and output sinusoids at the frequencies of interest. In addition, sinusoidal test signals may be useful for characterizing the non-linear behavior of a system. Distortion products can appear in many forms, but are most easily identified by spurious (i.e. unwanted) spectral components appearing at the device output in response to a stimulus of one or more sinusoidal test signals.

U.S. Pat. No. 5,357,594 (Fielder) discloses a system for subband audio coding employing a specially designed analysis-synthesis window. The Kaiser-Bessel Derived (KBD) window is constructed by a normalization process applied to an ordinary Kaiser-Bessel window such that the resulting window satisfies the TDAC perfect reconstruction conditions. The KBD window allows a convenient parametric tradeoff between main lobe width and side lobe attenuation by adjustment of the window parameter α. The Dolby® AC-3 codec uses the KBD window (α=4) as a symmetric analysis-synthesis window for the MDCT.

Figure 1:
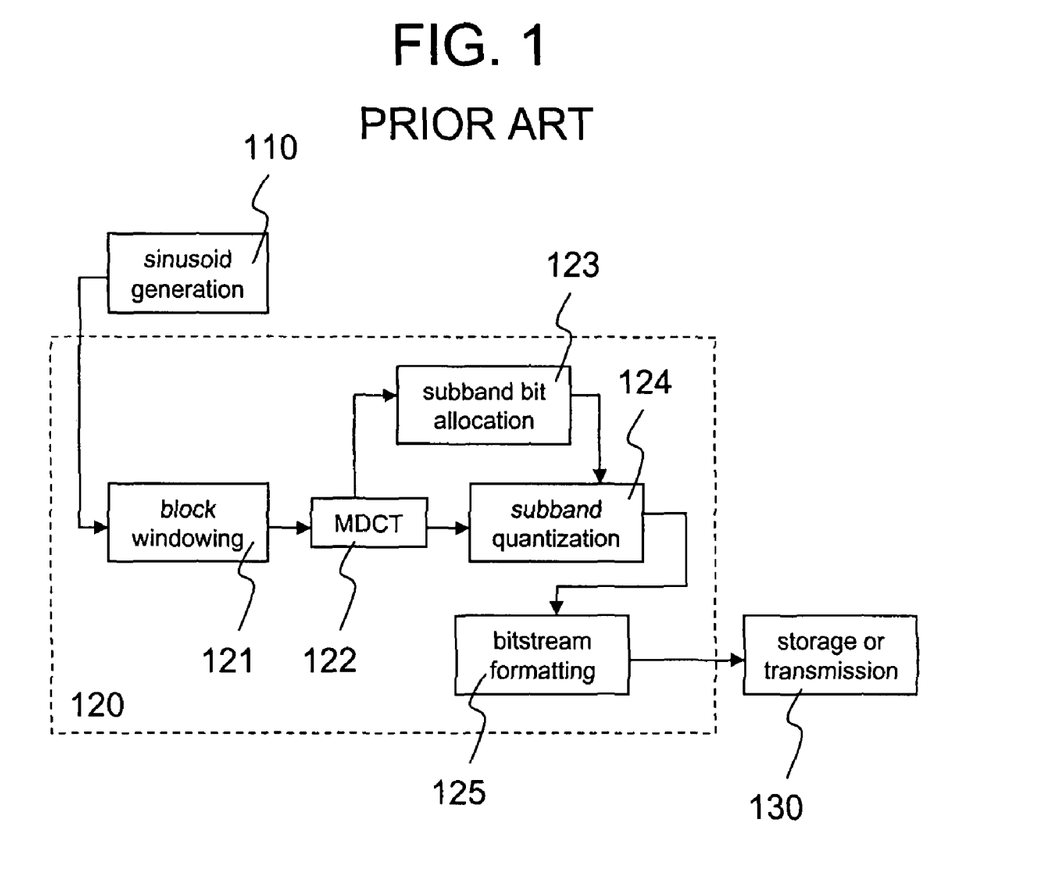
FIG. 1 illustrates a prior art apparatus for generating MDCT-coded sinusoidal test signals.

FIG. 1 generally depicts a prior art system for delivering sinusoidal test signals using a conventional prior art coding system similar to that disclosed in Fielder's patent. First is an apparatus for generation of a sinusoidal sequence 110, which may be implemented by a number of known methods including wave tables, Taylor series approximation or with a digitally implemented oscillator. This sequence is provided as input to a conventional MDCT-based audio codec 120, contained in FIG. 1 by a dashed line boundary. The input sequence is conventionally divided into 50% overlapping blocks and windowed 121 with an appropriate window sequence satisfying TDAC symmetry requirements. Windowed signal blocks are sent to an MDCT transformer 122 which produces a set of real-valued transform coefficients. The resulting MDCT coefficients are provided as input to a subband bit allocation process 123, which will typically employ a psychoacoustic masking model to minimize the perceptual impact of subband quantization with a given bit allocation budget. Based on the bit allocation thus produced, the MDCT coefficients are quantized 124 and assembled 125 into a properly formatted bitstream. This bitstream leaves the codec 120 and is finally transmitted or stored 130 for later decoding.

There are firms presently offering coded test signal generation systems which follow the lines of the exemplary prior art system 100. Audio Precision offers the OPT-2711 Dolby® Digital Generator upgrade to their 2700 series audio analyzers. The combined system contains a test signal generator followed by an encoder and hardware for delivering test signals in an AC-3 bitstream transmitted on an IEC-61937 interface. The OPT-2711 and similar devices employing this paradigm for the generation of MDCT-coded sinusoidal signals have the computational tasks of independently generating low-distortion sinusoidal sequences, windowing and performing the MDCT on this data, as well as computing bit allocations, quantizing and properly formatting the resultant bitstream.

A commonly encountered definition of the MDCT is:

$$X[k] \equiv \sum_{n=0}^{N-1} w[n]x[n]\cos\left[\frac{2\pi}{N}\left(n+\frac{1}{2}+\frac{N}{4}\right)\left(k+\frac{1}{2}\right)\right].$$

Evaluated directly the MDCT requires $O(N^2)$ computations per block. Fortunately more efficient methods of computing the MDCT have been devised in recent years. U.S. Pat. No. 6,430,529 (Huang) and U.S. Pat. No. 5,592,584 (Ferreira and Johnston) describe techniques for MDCT computation having an asymptotic complexity of only $O(N \log_2 N)$. These faster methods exploit the fact that the MDCT is mathematically equivalent to a time and frequency-shifted DFT. Using this equivalence the MDCT may be computed as a composition of FFT and complex pre- and post-multiplications.

It is desirable for many applications to further reduce the computational and memory requirements of producing MDCT-coded sinusoidal test signals. Unfortunately the MDCT has relatively complex mathematical properties when compared with other common discrete transforms. Many useful and important theorems which apply to a time-invariant transform such as the DFT do not apply directly to the MDCT. Most significantly to this disclosure, it is not possible to produce the MDCT of a time-translated sinusoid by simple multiplication with a phasor sequence in the transform domain.

An analytical approximation to the MDCT of a sinusoid is due to L. Daudet and M. Sandler, in "MDCT Analysis of Sinusoids: Exact Results and Applications for Coding Artifacts Reduction," *IEEE Transactions on Speech and Audio Processing*, Vol. 12, No. 3, May 2004, pp. 302-312. The authors assumed that a basic sine analysis window was used, and with a few other simplifying assumptions, the authors derived an approximation to the MDCT of a sinusoid for the purpose of understanding some common audible artifacts in MDCT-based audio codecs. However the authors did not present results which may be extended easily to other analysis/synthesis windows, and the approximation presented is unsuitable for low-distortion waveform synthesis. Moreover, the results derived in their paper became very poor at the extremes of the spectrum (i.e. for sinusoids with discrete-time frequency Ω close to extremal values 0 or π).

U.S. Pat. No. 7,058,571 (Tshushima, et al) discloses a method for injecting sinusoids into a single band of a real-valued filter bank (e.g. MDCT) while suppressing aliasing products that can appear in adjacent subbands. The method presented in Tshushima's patent is limited however to the synthesis of sinusoids at the center frequency of a filter bank subband. Furthermore the simple two-band aliasing suppression model Tshushima employed is insufficient for low distortion sinusoid synthesis with the MDCT. In the MDCT of a sinusoid there are a large number of MDCT coefficients which contribute significantly to the reconstructed waveform. The compensation signals disclosed by Tshushima therefore do not suffice for test and measurement applications where extremely low waveform distortion is required.

In light of the above and other considerations there is a need for a computationally efficient and accurate means for computing the MDCT of a sinusoidal signal. The method and/or apparatus should work well at any desired sinusoid frequency including extremes of the discrete-time frequency spectrum and away from MDCT bin center frequencies, and should be adaptable for compatibility with any analysis-synthesis window with excellent distortion performance.

BRIEF SUMMARY OF THE INVENTION

The methods and apparatus of the present invention provide a computationally efficient means for approximating the MDCT of a windowed sinusoid while requiring only modest memory storage requirements. The foregoing and other objectives, features, and advantages of the invention will be more readily understood upon consideration of the following detailed description of the invention, taken in conjunction with the accompanying drawings.

GLOSSARY OF TERMS

| | |
|---|---|
| block | a finite, contiguous subsequence |
| block index | indicates a specific block in an ordered block sequence segmentation |
| block length | the number of elements in a block |
| block phase | the starting phase of the sinusoidal sequence within a block |
| dot product | the inner product of two real vectors; the sum of the products of each corresponding vector component pair |
| multitone sequence | a sequence comprised of two or more sinusoidal sequences of differing frequencies |
| phase vector | used in the MDCT approximation; computed with the block phase |
| sample index | indicates a specific element within a block |
| sinusoidal sequence | a discrete-time sequence expressible as $a_0 \sin[n\Omega + \phi]$ |
| window summation table | a matrix of pre-computed summations over the finite trigonometric series approximating the window sequence; contains a row for each MDCT coefficient to be approximated for a given block |

DETAILED DESCRIPTION OF THE INVENTION

Figure 2:
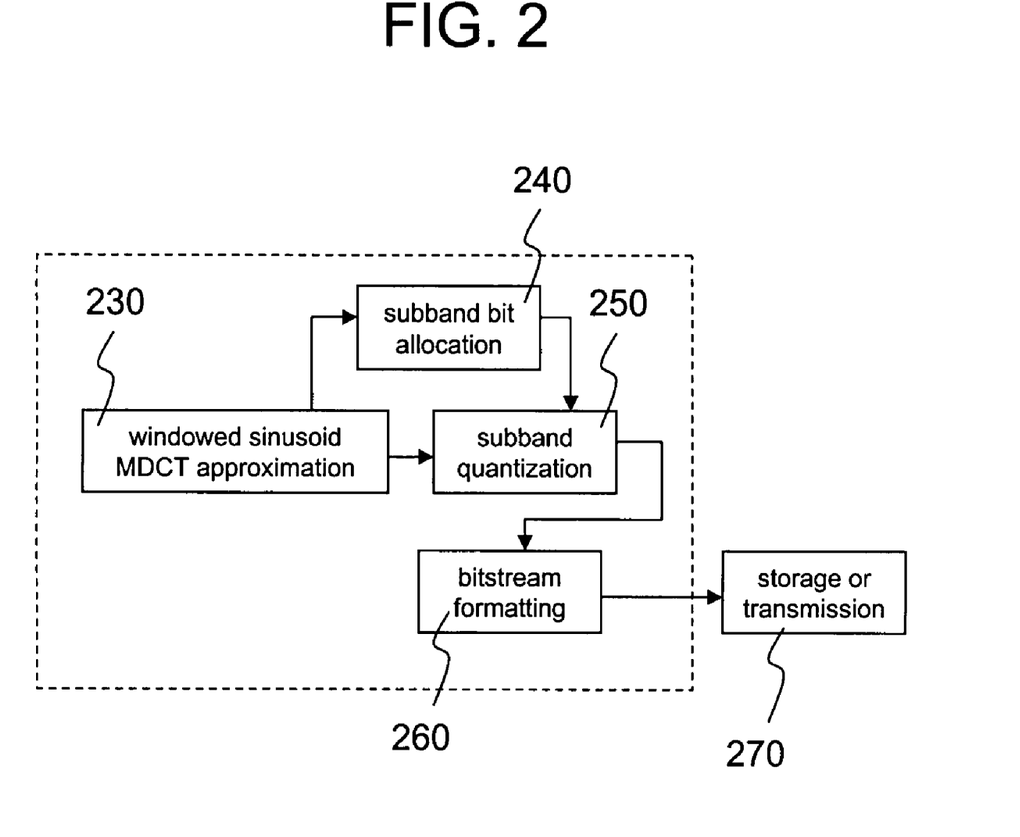
FIG. 2 shows a system for delivering coded sinusoidal test signals wherein several functional blocks have been replaced by a preferred embodiment of the present invention.

FIG. 2 shows a system for delivering coded sinusoidal test signals wherein several functional blocks have been replaced by a preferred embodiment of the present invention. Elements for sinusoid generation 110 as well as block windowing 121 and MDCT 122 functions from the prior art codec 120 have been replaced by a single block 230 for windowed sinusoid MDCT approximation. Certain preferred embodiments of the present invention may provide functionality for element 230 in this novel system. Blocks for subband bit allocation 240, subband quantization 250, bitstream formatting 260, and storage or transmission 270 are shown as part of a computationally efficient alternative to the prior art system depicted in FIG. 1.

The example system depicted in FIG. 2 illustrates a useful application of the present invention, but functional blocks 240, 250, 260, and 270 are highly specific to a given coding format and are not the claimed subject matter of this disclosure. The present invention will be applicable to many purposes not explicitly described herein or shown in FIG. 2.

The following is a mathematical development of the fast MDCT approximation method of the present invention. Consider a sinusoid defined as follows where Ω is the discrete-time frequency of the sinusoid, N is the block length, m is the block index, and n is the sample index within block m:

$$x[n] = \sin\left[\Omega\left(n + \frac{mN}{2}\right)\right].$$

In this disclosure the MDCT is defined by the following where x[n] is the original signal and w[n] is the window sequence:

$$X[k] \equiv \sum_{n=0}^{N-1} w[n]x[n]\cos\left[\frac{2\pi}{N}\left(n + \frac{1}{2} + \frac{N}{4}\right)\left(k + \frac{1}{2}\right)\right].$$

The present invention is also applicable to alternative formulations of the MDCT. The claims that follow should be construed to include steps and means for computing equivalent or trivially modified definitions of the MDCT as practicable by the methods and apparatus of this disclosure.

In a preferred embodiment of the present invention, an approximation to the analysis/synthesis window is employed according to the following form:

$$w'[n] = \sum_{l=0}^{L-1} W_l \cos\left[\frac{2\pi l\left(n + \frac{1}{2}\right)}{N}\right].$$

The finite cosine series defined above includes a half-sample time shift to allow for the best approximation of symmetric windows of length of a multiple of 2. The window coefficients $W_l$ may be chosen most simply by a dot-product decomposition of the window function into the provided cosine basis, truncating the series when the required accuracy to the prototype window is achieved.

$$W_l = \sum_{n=0}^{N-1} w[n]\cos\left[\frac{2\pi l\left(n + \frac{1}{2}\right)}{N}\right].$$

Finite cosine series coefficients may also be selected by various other means in accordance with the methods of the present invention including the use of mathematical optimization techniques such as least squares, gradient descent, or any of a number of other well-known optimization methods. The use of such techniques can (depending on the prototype window) allow an increase in MDCT approximation accuracy given a fixed number of cosine series coefficients.

It may be possible, by modifying the definition of the MDCT or shifting the origin, to use a finite trigonometric series of another basis in practicing the current invention. Insofar as such constructions are isomorphic (i.e. equivalent apart from trivial modifications) to those presented herein they should be construed to fall within the scope of the presently claimed invention.

Including the shifted finite cosine series approximation to the prototype window, an approximation to the MDCT coefficients of a sinusoid can be written as:

$$X'[k] \equiv \sum_{n=0}^{N-1} w'[n]\sin\left[\Omega\left(n + \frac{mN}{2}\right)\right]\cos\left[\frac{2\pi}{N}\left(n + \frac{1}{2} + \frac{N}{4}\right)\left(k + \frac{1}{2}\right)\right].$$

The following definitions are informative and useful for simplifying the above expression:

$$\phi \equiv \frac{mN\Omega}{2}$$

-continued $$\Omega_k \equiv \frac{2\pi}{N}\left(k + \frac{1}{2}\right)$$

$$\hat{n} \equiv \frac{2 + N}{4}.$$

To briefly explain the symbols introduced above, $\phi$ is the block phase indicating the starting phase of the sinusoid to be approximated at the first sample of the current MDCT block m. For simplicity of expression we have allowed the block phase ($\phi=0$ for m=0), but a constant may be added to $\phi$, shifting the sinusoid starting phase for all blocks m. Intuitively $\Omega_k$ corresponds to the center frequency of the kth MDCT bin. The sample offset "n-hat" is a constant closely related to the function of TDAC perfect reconstruction.

Using the above definitions and a product sum-identity the approximate MDCT is rewritten:

$$X'[k] =$$

$$\sum_{n=0}^{N-1} w'[n]\sin[\phi + n(\Omega - \Omega_k) - \hat{n}\Omega_k] + \frac{1}{2}\sum_{n=0}^{N-1} w'[n]\sin[\phi + n(\Omega + \Omega_k) + \hat{n}\Omega_k].$$

Including the shifted finite cosine series approximation yields the following expression:

$$X'[k] = \frac{1}{2}\sum_{n=0}^{N-1}\sum_{l=0}^{L-1} W_l \cos\left[\frac{2\pi l\left(n + \frac{1}{2}\right)}{N}\right]\sin[\phi + n(\Omega - \Omega_k) - \hat{n}\Omega_k] +$$

$$\frac{1}{2}\sum_{n=0}^{N-1}\sum_{l=0}^{L-1} W_l \cos\left[\frac{2\pi l\left(n + \frac{1}{2}\right)}{N}\right]\sin[\phi + n(\Omega + \Omega_k) + \hat{n}\Omega_k].$$

Using a product-sum identity, exchanging the order of summation and separating terms with a sum-difference identity it can be seen that:

$$X'[k] = \frac{1}{4}\sum_{l=0}^{L-1} W_l \sum_{n=0}^{N-1}\left(\sin\left[n\left(\Omega - \Omega_k - \frac{2\pi l}{N}\right)\right]\cos\left[\hat{n}\Omega_k - \phi + \frac{\pi l}{N}\right] - \right.$$

$$\left.\cos\left[n\left(\Omega - \Omega_k - \frac{2\pi l}{N}\right)\right]\sin\left[\hat{n}\Omega_k - \phi + \frac{\pi l}{N}\right]\right) +$$

$$\frac{1}{4}\sum_{l=0}^{L-1} W_l \sum_{n=0}^{N-1}\left(\sin\left[n\left(\Omega - \Omega_k + \frac{2\pi l}{N}\right)\right]\cos\left[\hat{n}\Omega_k - \phi - \frac{\pi l}{N}\right] - \right.$$

$$\left.\cos\left[n\left(\Omega - \Omega_k + \frac{2\pi l}{N}\right)\right]\sin\left[\hat{n}\Omega_k - \phi - \frac{\pi l}{N}\right]\right) +$$

$$\frac{1}{4}\sum_{l=0}^{L-1} W_l \sum_{n=0}^{N-1}\left(\sin\left[n\left(\Omega + \Omega_k - \frac{2\pi l}{N}\right)\right]\cos\left[\hat{n}\Omega_k + \phi - \frac{\pi l}{N}\right] + \right.$$

$$\left.\cos\left[n\left(\Omega + \Omega_k - \frac{2\pi l}{N}\right)\right]\sin\left[\hat{n}\Omega_k + \phi - \frac{\pi l}{N}\right]\right) +$$

$$\frac{1}{4}\sum_{l=0}^{L-1} W_l \sum_{n=0}^{N-1}\left(\sin\left[n\left(\Omega + \Omega_k + \frac{2\pi l}{N}\right)\right]\cos\left[\hat{n}\Omega_k + \phi + \frac{\pi l}{N}\right] + \right.$$

$$\cos\left[n\left(\Omega+\Omega_k+\frac{2\pi l}{N}\right)\right]\sin\left[\hat{n}\Omega_k+\phi+\frac{\pi l}{N}\right]\right).$$

A few more definitions are now helpful to further simplify the above expression:

$$\theta_{l,k}^+ \equiv \left(\Omega_k + \frac{2\pi l}{N}\right) = \frac{2\pi}{N}\left(\frac{1}{2}+k+l\right)$$

$$\theta_{l,k}^- \equiv \left(\Omega_k - \frac{2\pi l}{N}\right) = \frac{2\pi}{N}\left(\frac{1}{2}+k-l\right)$$

$$\psi_{k,m}^+ \equiv \hat{n}\Omega_k + \phi$$

$$\psi_{k,m}^- \equiv \hat{n}\Omega_k - \phi.$$

The expression may now be written a little more cleanly:

$$X'[k] = \frac{1}{4}\sum_{l=0}^{L-1} W_l \sum_{n=0}^{N-1}\left(\sin[n(\Omega-\theta_{l,k}^+)]\cos\left[\psi_{k,m}^- + \frac{\pi l}{N}\right] - \right.$$

$$\left.\cos[n(\Omega-\theta_{l,k}^+)]\sin\left[\psi_{k,m}^- + \frac{\pi l}{N}\right]\right) +$$

$$\frac{1}{4}\sum_{l=0}^{L-1} W_l \sum_{n=0}^{N-1}\left(\sin[n(\Omega-\theta_{l,k}^-)]\cos\left[\psi_{k,m}^- - \frac{\pi l}{N}\right] - \right.$$

$$\left.\cos[n(\Omega-\theta_{l,k}^-)]\sin\left[\psi_{k,m}^- - \frac{\pi l}{N}\right]\right) +$$

$$\frac{1}{4}\sum_{l=0}^{L-1} W_l \sum_{n=0}^{N-1}\left(\sin[n(\Omega+\theta_{l,k}^-)]\cos\left[\psi_{k,m}^+ - \frac{\pi l}{N}\right] + \right.$$

$$\left.\cos[n(\Omega+\theta_{l,k}^-)]\sin\left[\psi_{k,m}^+ - \frac{\pi l}{N}\right]\right) +$$

$$\frac{1}{4}\sum_{l=0}^{L-1} W_l \sum_{n=0}^{N-1}\left(\sin[n(\Omega+\theta_{l,k}^+)]\cos\left[\psi_{k,m}^+ + \frac{\pi l}{N}\right] + \right.$$

$$\left.\cos[n(\Omega+\theta_{l,k}^+)]\sin\left[\psi_{k,m}^+ + \frac{\pi l}{N}\right]\right).$$

Using sum and difference identities and factoring like terms the above expression can be rewritten as:

$$X'[k] = \frac{1}{4}\cos[\psi_{k,m}^+]\sum_{l=0}^{L-1} W_l \cos\left[\frac{\pi l}{N}\right]\sum_{n=0}^{N-1}(\sin[n(\Omega+\theta_{l,k}^+)] + \sin[n(\Omega+\theta_{l,k}^-)]) +$$

$$\frac{1}{4}\cos[\psi_{k,m}^+]\sum_{l=0}^{L-1} W_l \sin\left[\frac{\pi l}{N}\right]\sum_{n=0}^{N-1}(\cos[n(\Omega+\theta_{l,k}^+)] - \cos[n(\Omega+\theta_{l,k}^-)]) +$$

$$\frac{1}{4}\sin[\psi_{k,m}^+]\sum_{l=0}^{L-1} W_l \cos\left[\frac{\pi l}{N}\right]\sum_{n=0}^{N-1}(\cos[n(\Omega+\theta_{l,k}^+)] + \cos[n(\Omega+\theta_{l,k}^-)]) +$$

$$\frac{1}{4}\sin[\psi_{k,m}^+]\sum_{l=0}^{L-1} W_l \sin\left[\frac{\pi l}{N}\right]\sum_{n=0}^{N-1}(\sin[n(\Omega+\theta_{l,k}^-)] - \sin[n(\Omega+\theta_{l,k}^+)]) +$$

$$\frac{1}{4}\cos[\psi_{k,m}^-]\sum_{l=0}^{L-1} W_l \cos\left[\frac{\pi l}{N}\right]\sum_{n=0}^{N-1}(\sin[n(\Omega-\theta_{l,k}^+)] + \sin[n(\Omega-\theta_{l,k}^-)]) +$$

$$\frac{1}{4}\cos[\psi_{k,m}^-]\sum_{l=0}^{L-1} W_l \sin\left[\frac{\pi l}{N}\right]\sum_{n=0}^{N-1}(\cos[n(\Omega-\theta_{l,k}^+)] - \cos[n(\Omega-\theta_{l,k}^-)]) -$$

$$\frac{1}{4}\sin[\psi_{k,m}^-]\sum_{l=0}^{L-1} W_l \cos\left[\frac{\pi l}{N}\right]\sum_{n=0}^{N-1}(\cos[n(\Omega-\theta_{l,k}^+)] + \cos[n(\Omega-\theta_{l,k}^-)]) +$$

$$\frac{1}{4}\sin[\psi_{k,m}^-]\sum_{l=0}^{L-1} W_l \sin\left[\frac{\pi l}{N}\right]\sum_{n=0}^{N-1}(\sin[n(\Omega-\theta_{l,k}^-)] - \sin[n(\Omega-\theta_{l,k}^+)]).$$

Notice that terms directly involving n have been separated from those not involving n. It is possible to perform the summations over n analytically using the following formulae:

$$\sum_{p=0}^{P} \sin[pC] = \frac{\sin\left(\frac{1}{2}PC\right)\sin\left(\frac{1}{2}(P+1)C\right)}{\sin\left(\frac{1}{2}C\right)}$$

$$\sum_{p=0}^{P} \cos[pC] = \frac{\cos\left(\frac{1}{2}PC\right)\sin\left(\frac{1}{2}(P+1)C\right)}{\sin\left(\frac{1}{2}C\right)}.$$

Performing summations over n analytically, the approximate MDCT can be expressed:

$$X'[k] =$$

$$\frac{1}{4}\cos[\psi_{k,m}^+]\sum_{l=0}^{L-1} W_l \left[\cos\left[\frac{\pi l}{N}\right]\left(\frac{\sin\left[\frac{1}{2}(N-1)(\Omega+\theta_{l,k}^+)\right]\sin\left[\frac{N}{2}(\Omega+\theta_{l,k}^+)\right]}{\sin\left[\frac{1}{2}(\Omega+\theta_{l,k}^+)\right]}\right. + \right.$$

$$\left.\frac{\sin\left[\frac{1}{2}(N-1)(\Omega+\theta_{l,k}^-)\right]\sin\left[\frac{N}{2}(\Omega+\theta_{l,k}^-)\right]}{\sin\left[\frac{1}{2}(\Omega+\theta_{l,k}^-)\right]}\right) +$$

$$\sin\left[\frac{\pi l}{N}\right]\left(\frac{\cos\left[\frac{1}{2}(N-1)(\Omega+\theta_{l,k}^+)\right]\sin\left[\frac{N}{2}(\Omega+\theta_{l,k}^+)\right]}{\sin\left[\frac{1}{2}(\Omega+\theta_{l,k}^+)\right]} -$$

$$\left.\left.\frac{\cos\left[\frac{1}{2}(N-1)(\Omega+\theta_{l,k}^-)\right]\sin\left[\frac{N}{2}(\Omega+\theta_{l,k}^-)\right]}{\sin\left[\frac{1}{2}(\Omega+\theta_{l,k}^-)\right]}\right)\right] +$$

$$\frac{1}{4}\sin[\psi_{k,m}^+]\sum_{l=0}^{L-1} W_l \left[\cos\left[\frac{\pi l}{N}\right]\left(\frac{\cos\left[\frac{1}{2}(N-1)(\Omega+\theta_{l,k}^+)\right]\sin\left[\frac{N}{2}(\Omega+\theta_{l,k}^+)\right]}{\sin\left[\frac{1}{2}(\Omega+\theta_{l,k}^+)\right]} +\right.\right.$$

$$\left.\left.\frac{\cos\left[\frac{1}{2}(N-1)(\Omega+\theta_{l,k}^-)\right]\sin\left[\frac{N}{2}(\Omega+\theta_{l,k}^-)\right]}{\sin\left[\frac{1}{2}(\Omega+\theta_{l,k}^-)\right]}\right)\right] +$$

-continued $$\sin\left[\frac{\pi l}{N}\right]\left(\frac{\sin\left[\frac{1}{2}(N-1)(\Omega+\theta_{l,k}^-)\right]\sin\left[\frac{N}{2}(\Omega+\theta_{l,k}^-)\right]}{\sin\left[\frac{1}{2}(\Omega+\theta_{l,k}^-)\right]} - \frac{\sin\left[\frac{1}{2}(N-1)(\Omega+\theta_{l,k}^+)\right]\sin\left[\frac{N}{2}(\Omega+\theta_{l,k}^+)\right]}{\sin\left[\frac{1}{2}(\Omega+\theta_{l,k}^+)\right]}\right) +$$

$$\frac{1}{4}\cos[\psi_{k,m}^-]\sum_{l=0}^{L-1} W_l \left[\cos\left[\frac{\pi l}{N}\right]\left(\frac{\sin\left[\frac{1}{2}(N-1)(\Omega-\theta_{l,k}^+)\right]\sin\left[\frac{N}{2}(\Omega-\theta_{l,k}^+)\right]}{\sin\left[\frac{1}{2}(\Omega-\theta_{l,k}^+)\right]} + \frac{\sin\left[\frac{1}{2}(N-1)(\Omega-\theta_{l,k}^-)\right]\sin\left[\frac{N}{2}(\Omega-\theta_{l,k}^-)\right]}{\sin\left[\frac{1}{2}(\Omega-\theta_{l,k}^-)\right]}\right) +$$

$$\sin\left[\frac{\pi l}{N}\right]\left(\frac{\cos\left[\frac{1}{2}(N-1)(\Omega-\theta_{l,k}^-)\right]\sin\left[\frac{N}{2}(\Omega-\theta_{l,k}^-)\right]}{\sin\left[\frac{1}{2}(\Omega-\theta_{l,k}^-)\right]} - \frac{\cos\left[\frac{1}{2}(N-1)(\Omega-\theta_{l,k}^+)\right]\sin\left[\frac{N}{2}(\Omega-\theta_{l,k}^+)\right]}{\sin\left[\frac{1}{2}(\Omega-\theta_{l,k}^+)\right]}\right)\right] -$$

$$\frac{1}{4}\sin[\psi_{k,m}^-]\sum_{l=0}^{L-1} W_l \left[\cos\left[\frac{\pi l}{N}\right]\left(\frac{\cos\left[\frac{1}{2}(N-1)(\Omega-\theta_{l,k}^+)\right]\sin\left[\frac{N}{2}(\Omega-\theta_{l,k}^+)\right]}{\sin\left[\frac{1}{2}(\Omega-\theta_{l,k}^+)\right]} + \frac{\cos\left[\frac{1}{2}(N-1)(\Omega-\theta_{l,k}^-)\right]\sin\left[\frac{N}{2}(\Omega-\theta_{l,k}^-)\right]}{\sin\left[\frac{1}{2}(\Omega-\theta_{l,k}^-)\right]}\right) -$$

$$\sin\left[\frac{\pi l}{N}\right]\left(\frac{\sin\left[\frac{1}{2}(N-1)(\Omega-\theta_{l,k}^-)\right]\sin\left[\frac{N}{2}(\Omega-\theta_{l,k}^-)\right]}{\sin\left[\frac{1}{2}(\Omega-\theta_{l,k}^-)\right]} - \frac{\sin\left[\frac{1}{2}(N-1)(\Omega-\theta_{l,k}^+)\right]\sin\left[\frac{N}{2}(\Omega-\theta_{l,k}^+)\right]}{\sin\left[\frac{1}{2}(\Omega-\theta_{l,k}^+)\right]}\right)\right].$$

Since the remaining terms in each of the four sums over l are independent of the block m, this form lends itself naturally to the use of a table, which need only to be computed once for a given sinusoid frequency Ω. This allows very efficient computation as viewed on average over many blocks. Employing a pre-computed window summation table T with a unique row for each bin k to be approximated, the following expression is obtained:

$$X'[k] = \frac{1}{4}\cos[\psi_{k,m}^+]T[k,1] + \frac{1}{4}\sin[\psi_{k,m}^+]T[k,2] + \frac{1}{4}\cos[\psi_{k,m}^-]T[k,3] - \frac{1}{4}\sin[\psi_{k,m}^-]T[k,4].$$

In a vector-matrix formulation, the kth approximate MDCT coefficient is just the dot product of the kth row of the window summation table T with a kth phase vector $\psi_{k,m}$.

$$\Psi_{k,m} = \begin{pmatrix} \frac{1}{4}\cos[\psi_{k,m}^+] \\ \frac{1}{4}\sin[\psi_{k,m}^+] \\ \frac{1}{4}\cos[\psi_{k,m}^-] \\ \frac{1}{4}\sin[-\psi_{k,m}^-] \end{pmatrix}.$$

Using this definition the kth approximate MDCT coefficient may be expressed very cleanly:

$$X'[k]=T[k]\cdot\Psi_{k,m}.$$

For each block m and bin k there is a non-trivial cost associated with computing the phase vector $\psi_{k,m}$. This cost may be significant because sine or cosine computations typically require many more processor cycles than addition or multiplication. The cost of computing the kth phase vector $\psi_{k,m}$ can be greatly reduced by use of the following identities:

$$\sin[\psi_{k,m}^+]=\sin[\tilde{n}\Omega_k+\phi]=\sin[\tilde{n}\Omega_k]\cos[\phi]+\cos[\tilde{n}\Omega_k]\sin[\phi]$$

$$\sin[\psi_{k,m}^-]=\sin[\tilde{n}\Omega_k-\phi]=\sin[\tilde{n}\Omega_k]\cos[\phi]-\cos[\tilde{n}\Omega_k]\sin[\phi]$$

$$\cos[\psi_{k,m}^+]=\cos[\tilde{n}\Omega_k+\phi]=\cos[\tilde{n}\Omega_k]\cos[\phi]-\sin[\tilde{n}\Omega_k]\sin[\phi]$$

$$\cos[\psi_{k,m}^-]=\cos[\tilde{n}\Omega_k-\phi]=\cos[\tilde{n}\Omega_k]\cos[\phi]+\sin[\tilde{n}\Omega_k]\sin[\phi]$$

Using the identities above, the kth phase vector $\psi_{k,m}$ may be separated into static and dynamic parts. Only one cosine and sine computation are required per block to produce the block phase φ. Factors involving the bin center frequency $\Omega_k$ are constant across all blocks m, and indeed for all sinusoid frequencies Ω. To approximate the MDCT of a sine wave of any desired non-unity amplitude, it is only necessary to finally post-multiply the coefficients produced by the methods of the present invention by a scale factor.

Figure 3:
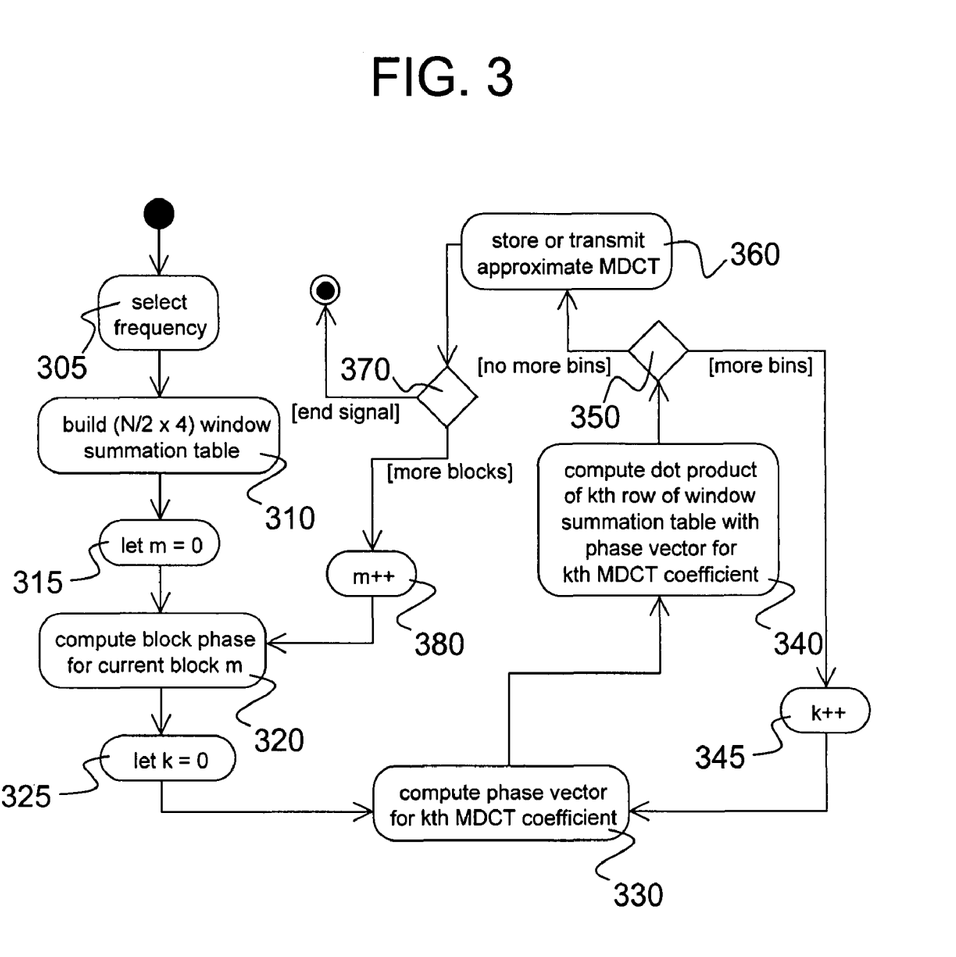
FIG. 3 is an activity diagram illustrating a preferred embodiment of the present invention.

FIG. 3 is an activity diagram illustrating a preferred embodiment of the present invention. The step of defining a finite trigonometric series to approximate the window sequence is not shown here.

Figure 4:
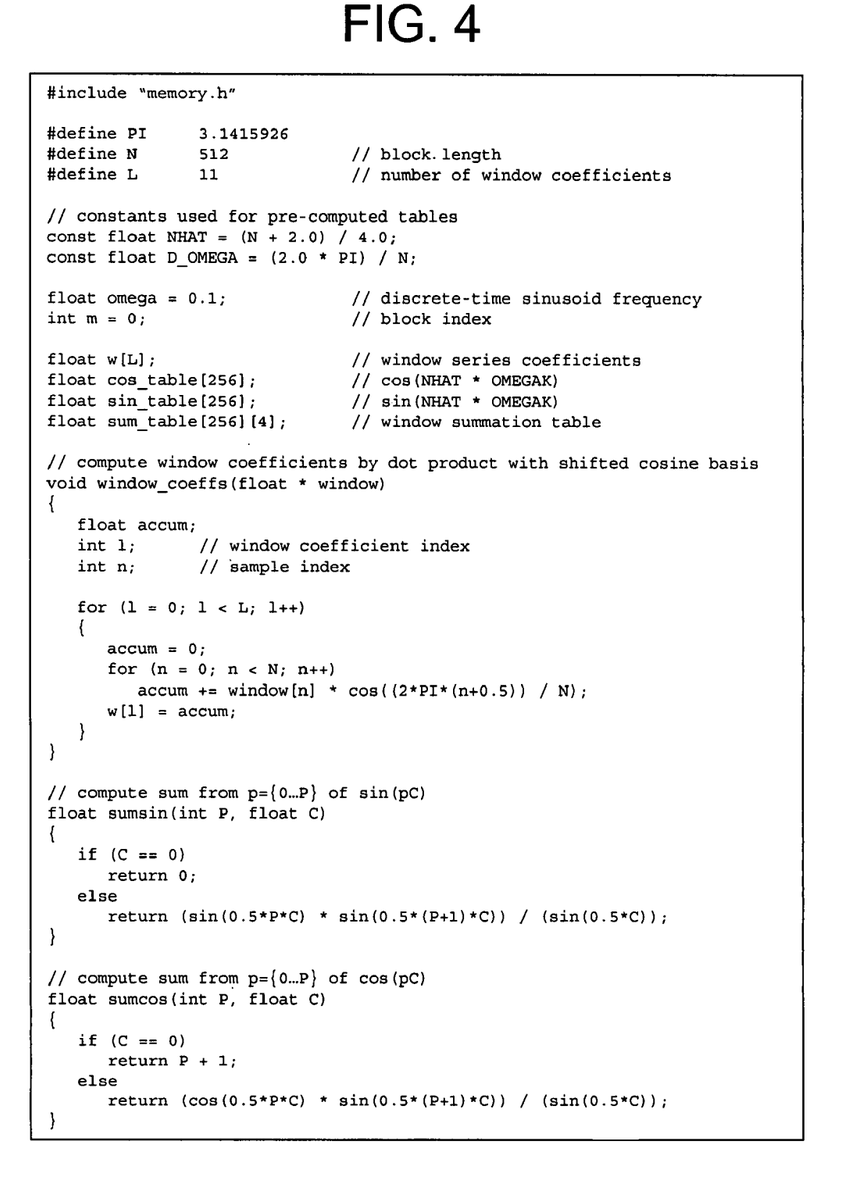
FIG. 4 is a C source listing providing declarations, storage and auxiliary functions in accordance with a preferred embodiment of the present invention.

Refer to the C function void window_coeffs (float*window) in the source listing of FIG. 4 providing means for computing the window coefficients when using a shifted finite cosine series as an approximation to the window sequence.

Assuming that the window coefficients for the finite trigonometric series approximating the window sequence have been computed, the next step is to define a frequency 305 for the sinusoidal sequence. A window summation table may then be pre-computed 310 using the finite trigonometric series (i.e. window coefficients) and the defined frequency of the sinusoidal sequence.

Figure 5:
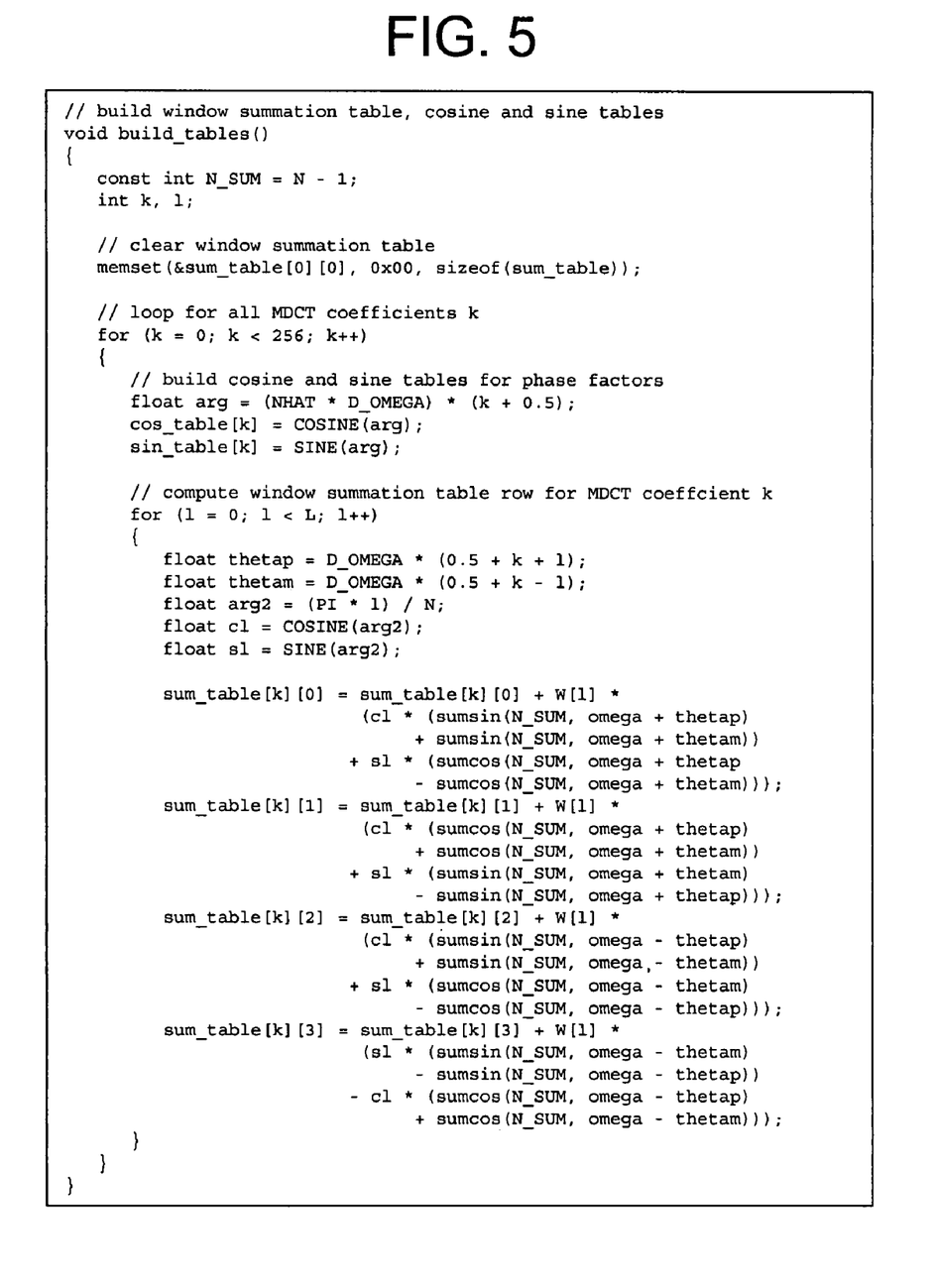
FIG. 5 is a C source listing providing a function for computing a window summation table in accordance with a preferred embodiment of the present invention.

Refer to the C function void build_tables( ) in the source listing of FIG. 5 providing means for pre-computing a window summation table using the functions float sumsin(int P, float C) and float sumcos(int P, float C) in the source listing of FIG. 4.

In the preferred embodiment shown in FIG. 3, the block index is reset (m=0) 315 before beginning the actual MDCT approximation. First in the loop, the block phase is computed 320 using the defined frequency of the sinusoidal sequence, the block length N, and the block index m. Now a loop is made over all MDCT coefficients to be approximated, starting in this preferred embodiment with the lowest frequencies (k=0)

325. For the kth MDCT coefficient the phase vector is computed 330 using the block phase. The kth MDCT coefficient is approximated by computing 340 the dot product of row k of the window summation table with the phase vector.

Figure 6:
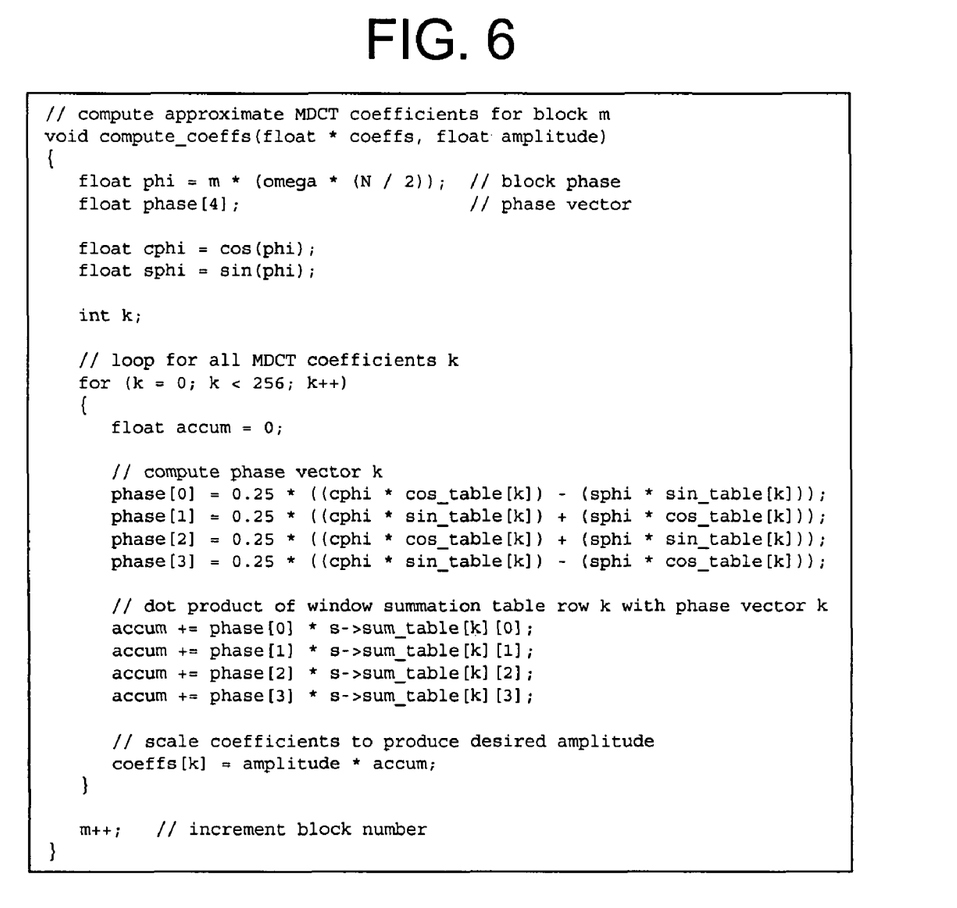
FIG. 6 is a C source listing providing a function for computing the approximate MDCT of a windowed block of a sinusoidal sequence in accordance with a preferred embodiment of the present invention.

Refer to the C function void compute_coeffs (float*coeffs, float amplitude) in the source listing of FIG. 6 providing means for performing the MDCT approximation as described above.

If it is determined 350 there are more MDCT coefficients to be approximated, then the bin number k is incremented 345, otherwise the approximate MDCT is stored or transmitted 360 for use by a calling software process or cooperating hardware. If it is then determined 370 that there are more blocks to be approximated then the block index m is incremented 380 and the block phase for the next block is computed 320.

Because the MDCT is a linear transformation, it is straightforward to construct the approximate MDCT of two or more sinusoidal sequences of differing frequencies (i.e. a multitone sequence) by linear combination of the results of two or more independent MDCT approximations according to the present invention. Because the computational and memory requirements of the present invention are small it may be possible to simultaneously approximate and linearly combine the MDCT coefficients for many sinusoids using commonly available and inexpensive microprocessor hardware, although for very large numbers of sinusoids the computational savings over a direct or FFT-based MDCT would be somewhat diminished. The use of multitone signals to perform fast transfer function and distortion measurements is disclosed in U.S. Pat. No. 5,420,516 (Cabot).

The present invention is also adaptable to perform additive synthesis directly in the MDCT domain. Multiple harmonically related (or not) sine waves may be approximated with any desired amplitude and phase relationship to produce a variety of musically useful timbres. With the addition of controls for the temporal envelope of the signal over many MDCT blocks and an interface to a pitch control system such as MIDI, a musically useful synthesizer could be obtained.

Figure 7:
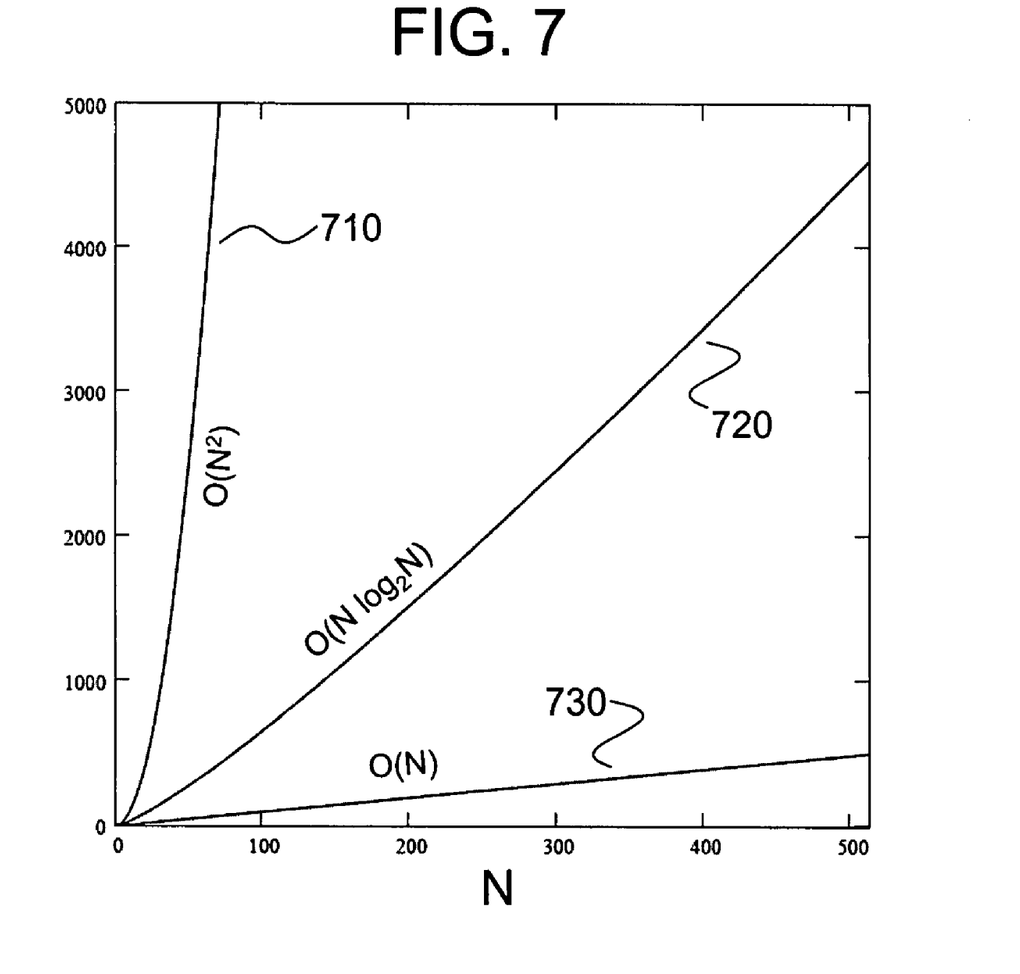
FIG. 7 is a graph comparing asymptotic complexity growth for $O(N^2)$, $O(N \log_2 N)$, and $O(N)$ algorithms.

FIG. 7 is a graph comparing asymptotic complexity growth for $O(N^2)$, $O(N \log_2 N)$, and $O(N)$ algorithms. The precise number of discrete computations required for computing the MDCT is very platform and code-specific so the graph should be interpreted as a dimensionless model of computation growth with respect to the block length N. Direct MDCT computation for large block lengths N is very computationally expensive with an asymptotic complexity of $O(N^2)$ 710. More sophisticated DFT-based methods with complex pre- and post-multiplications have an improved asymptotic complexity of $O(N \log_2 N)$ 720.

The present invention provides a means for computing an accurate approximation of the MDCT of a windowed sinusoid with an asymptotic complexity of only $O(N)$ 730. For large block lengths N the present invention allows substantial savings in both the computational cost of performing the MDCT itself as well as entirely avoiding computations required for low-distortion sinusoidal signal generation. Memory storage requirements for implementing the methods and apparatus of the present invention as disclosed in this specification are very modest. The window summation table contains only 2N entries, and the static part of the phase vector calculation requires storing at most N values. In addition, the present invention does not require special computational hardware and is straightforward to implement.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. a method for generating an audio sine wave directly in the transform domain by approximating an MDCT coefficient of a block of a sinusoidal sequence having a defined frequency, the block being multiplied by a window sequence and having a block length and a block index, said method comprising:

defining a finite trigonometric series to approximate the window sequence, pre-computing a window summation table using said finite trigonometric series and the defined frequency, said window summation table having a row corresponding to the MDCT coefficient, computing a block phase with the defined frequency of the sinusoidal sequence, the block length and the block index, computing a phase vector corresponding to the MDCT coefficient using said block phase, approximating the value of the MDCT coefficient by computing a dot product of said row of said window summation table with said phase vector, and performing the above steps using a processor to generate said audio sine wave.

2. The method of claim 1 wherein said step of defining a finite trigonometric series to approximate the window sequence is performed according to the following equation where $W_l$ is a window coefficient, n is the sample index, and N is the block length:

$$w'[n] = \sum_{l=0}^{L-1} W_l \cos\left[\frac{2\pi l \left(n + \frac{1}{2}\right)}{N}\right].$$

3. The method of claim 1 further comprising post-multiplying said dot product by a scale factor to produce a desired amplitude for the sinusoidal sequence.

4. An apparatus for generating a sine wave directly in the transform domain by approximating an MDCT coefficient of a block of a sinusoidal sequence having a defined frequency, the block being multiplied by a window sequence and having a block length and a block index, said apparatus comprising:

means for defining a finite trigonometric series to approximate the window sequence, means for pre-computing a window summation table using said finite trigonometric series and the defined frequency, said window summation table having a row corresponding to the MDCT coefficient, means for computing a block phase with the defined frequency of the sinusoidal sequence, the block length, and the block index, means for computing a phase vector corresponding to the MDCT coefficient using said block phase, and means for approximating the value of the MDCT coefficient by computing a dot product of said row of said window summation table with said phase vector.

5. The apparatus of claim 4 wherein said means for defining a finite trigonometric series to approximate the window sequence operates according to the following equation where $W_l$ is a window coefficient, n is the sample index, and N is the block length:

$$w'[n] = \sum_{l=0}^{L-1} W_l \cos\left[\frac{2\pi l\left(n + \frac{1}{2}\right)}{N}\right].$$

6. The apparatus of claim 4 further comprising means for post-multiplying said dot product MDCT coefficient by a scale factor to produce a desired amplitude for the sinusoidal sequence.

7. A method for generating audio sine waves directly in the transform domain by approximating an MDCT coefficient of a block of a multitone sequence, the multitone sequence comprising the sum of a first sinusoidal sequence having a first defined frequency and a second sinusoidal sequence having a second defined frequency, the block being multiplied by a window sequence and having a block length and a block index, said method comprising:
  defining a finite trigonometric series to approximate the window sequence, pre-computing a first window summation table using said finite trigonometric series and the defined frequency, said first window summation table having a first row corresponding to the MDCT coefficient, and pre-computing a second window summation table using said finite trigonometric series and the second defined frequency, said second window summation table having a second row corresponding to the MDCT coefficient, computing a first block phase with the first defined frequency of the first sinusoidal sequence, the block length, and the block index, and computing a second block phase with the second defined frequency of the second sinusoidal sequence, the block length, and the block index, computing a first phase vector corresponding to the MDCT coefficient using said first block phase, and computing a second phase vector corresponding to the MDCT coefficient using said second block phase, computing a first dot product of said first row of said first window summation table with said first phase vector, and computing a second dot product of said second row of said second window summation table with said second phase vector, approximating the value of the MDCT coefficient by adding said first dot product and said second dot product, and performing the above steps using a processor to generate said audio sine waves.

8. The method of claim 1 further comprising the step of delivering coded sinusoidal test signals.

9. The apparatus of claim 4 further comprising means for delivering coded sinusoidal test signals.

10. The method of claim 7 further comprising the step of delivering coded sinusoidal test signals.

11. The method of claim 7 further comprising post-multiplying said dot product by a scale factor to produce a desired amplitude for the sinusoidal sequence.

12. The method of claim 1 further comprising the step of repeating at least one step selected from the group consisting of:
  (a) computing a block phase with the defined frequency of the sinusoidal sequence, the block length, and the block index,
  (b) computing a phase vector corresponding to the MDCT coefficient using said block phase, and
  (c) approximating the value of the MDCT coefficient by computing a dot product of said row of said window summation table with said phase vector.

13. The apparatus of claim 4 repetitively using at least one of the following means selected from the group consisting of:
  (a) means for computing a block phase with the defined frequency of the sinusoidal sequence, the block length, and the block index,
  (b) means for computing a phase vector corresponding to the MDCT coefficient using said block phase, and
  (c) means for approximating the value of the MDCT coefficient by computing a dot product of said row of said window summation table with said phase vector.

14. The method of claim 7 further comprising the step of repeating at least one step selected from the group consisting of:
  (a) computing a first block phase with the first defined frequency of the first sinusoidal sequence, the block length, and the block index, and computing a second block phase with the second defined frequency of the second sinusoidal sequence, the block length, and the block index,
  (b) computing a first phase vector corresponding to the MDCT coefficient using said first block phase, and computing a second phase vector corresponding to the MDCT coefficient using said second block phase,
  (c) computing a first dot product of said first row of said first window summation table with said first phase vector, and computing a second dot product of said second row of said second window summation table with said second phase vector, and
  (d) approximating the value of the MDCT coefficient by adding said first dot product and said second dot product.

15. The method of claim 1 further comprising the step of repeating the steps of:
  (a) computing a block phase with the defined frequency of the sinusoidal sequence, the block length, and the block index,
  (b) computing a phase vector corresponding to the MDCT coefficient using said block phase, and
  (c) approximating the value of the MDCT coefficient by computing a dot product of said row of said window summation table with said phase vector.

16. The apparatus of claim 4 repetitively using the following means:
  (a) means for computing a block phase with the defined frequency of the sinusoidal sequence, the block length, and the block index,
  (b) means for computing a phase vector corresponding to the MDCT coefficient using said block phase, and
  (c) means for approximating the value of the MDCT coefficient by computing a dot product of said row of said window summation table with said phase vector.

17. The method of claim 7 further comprising the step of repeating the steps of:
  (a) computing a first block phase with the first defined frequency of the first sinusoidal sequence, the block length, and the block index, and computing a second block phase with the second defined frequency of the second sinusoidal sequence, the block length, and the block index,
  (b) computing a first phase vector corresponding to the MDCT coefficient using said first block phase, and computing a second phase vector corresponding to the MDCT coefficient using said second block phase,
  (c) computing a first dot product of said first row of said first window summation table with said first phase vector, and computing a second dot product of said second row of said second window summation table with said second phase vector, and
  (d) approximating the value of the MDCT coefficient by adding said first dot product and said second dot product.

18. The method of claim 1, repeating said step of pre-computing a window summation table using said finite trigonometric series and the defined frequency, said window summation table having a row corresponding to the MDCT coefficient in response to a change in frequency.

19. The apparatus of claim 4, in response to a change in frequency repetitively using means for pre-computing a window summation table using said finite trigonometric series and the defined frequency, said window summation table having a row corresponding to the MDCT coefficient.

20. The method of claim 7, in response to a change in frequency, repeating said step of pre-computing a first window summation table using said finite trigonometric series and the defined frequency, said first window summation table having a first row corresponding to the MDCT coefficient, and repeating said step of pre-computing a second window summation table using said finite trigonometric series and the second defined frequency, said second window summation table having a second row corresponding to the MDCT coefficient.

21. The method of claim 1, said step of defining a finite trigonometric series to approximate the window sequence further comprising the step of defining a finite trigonometric multiple element series to approximate the window sequence.

22. The apparatus of claim 4, said means for defining a finite trigonometric series to approximate the window sequence further comprising means for defining a finite trigonometric multiple element series to approximate the window sequence.

23. The method of claim 7, said step of defining a finite trigonometric series to approximate the window sequence further comprising the step of defining a finite trigonometric multiple element series to approximate the window sequence.

* * * * *